Sept. 2, 1958     P. C. GAUDILLERE     2,850,729
POSITION DETERMINATION SYSTEM USING MOBILE
RADIO INTERFERENCE FRINGES
Filed May 10, 1954                        6 Sheets-Sheet 1

INVENTOR
PIERRE C. GAUDILLERE
BY Riggins & LeBlanc
ATTORNEYS

Sept. 2, 1958 P. C. GAUDILLERE 2,850,729
POSITION DETERMINATION SYSTEM USING MOBILE
RADIO INTERFERENCE FRINGES
Filed May 10, 1954 6 Sheets-Sheet 2

INVENTOR
PIERRE C. GAUDILLERE
BY Diggins & LeBlanc
ATTORNEYS

Sept. 2, 1958 P. C. GAUDILLERE 2,850,729
POSITION DETERMINATION SYSTEM USING MOBILE
RADIO INTERFERENCE FRINGES
Filed May 10, 1954 6 Sheets-Sheet 5

INVENTOR
PIERRE CLAUDE GAUDILLERE
BY
Strauch, Nolan & Diggins
ATTORNEYS

United States Patent Office
2,850,729
Patented Sept. 2, 1958

2,850,729

POSITION DETERMINATION SYSTEM USING MOBILE RADIO INTERFERENCE FRINGES

Pierre Claude Gaudillere, Neuilly-sur-Seine, France

Application May 10, 1954, Serial No. 428,777

Claims priority, application France May 12, 1953

11 Claims. (Cl. 343—105)

It is known, in particular from the U. S. application Ser. No. 302,973 filed on August 6, 1952, now Patent No. 2,727,231 issued Dec. 13, 1955, to use for the subjective and objective determination of the position of a point in a determined area and for selectively establishing communication between a point situated in this area and the station which obtains the objective determination of the position of this point, a system utilizing the properties of mobile radio interference fringes termed isophase lines which constitute the locus of points at which the two signals emitted by two transmitters are received in phase concordance. A system of this type comprises at least one pair of transmitters A and B which are respective disposed at the two ends of a straight line traversing the area where the position determination is to be effected, the two transmitters being so arranged that each emits a signal, the frequencies of these signals being near to one another.

In practice, each of the transmitters A and B emits a carrier wave of special frequency modulated with the aid of a low-frequency oscillation, the modulation frequencies $p$ and $q$ used respectively in the transmitters A and B being distinct but not very far from one another.

As has been mentioned in the aforementioned application, the isophase lines have the following properties:

(a) At any point M in space the passage of this line occurs at intervals of time $$T = \frac{1}{p-q}$$

i. e. it sweeps with a frequency $F = p-q$ the area in which may be received simultaneously the signals emitted by A and B.

(b) If $r_A$ and $r_B$ are the distances from M to the transmitters A and B, the form of the curve is defined by the equation $pr_A - qr_B = \text{constant}$.

When the values of $p$ and $q$ are near one another, this form is similar to that of a branch of a hyperbola having A and B as focii.

(c) The travelling velocity of the isophase line measured along the straight line segment AB is equal to $$V_0 = c \frac{p-q}{p+q}$$

in which $c$ is the velocity of the electromagnetic waves. Thus, it may be adjusted as desired by suitably selecting the frequencies $p$ and $q$.

(d) At a given instant there is only a single isophase line in space if the distance between the transmitters $AB = d$ is less than $$\frac{c}{p+q}$$

this inequality is the condition of non-ambiguity.

The system defined above further comprises means for measuring time, namely the time interval between the passage of the isophase curve at the point whose position is to be determined and the reception at this point of a signal emitted by a fixed transmitter at the moment when this curve passes through a reference point of known position.

By this measurement it is possible to determine on which curve of a family of "position lines" is situated the point whose position is to be determined, these curves being in this case hyperbolae.

One of the principal objects of the present invention is to provide a system by means of which it is possible to obtain position lines which are no longer necessarily hyperbolae, but curves of various forms adapted for different problems met with in position determination. This object is attained by the system of the present invention which comprises a group of transmitters creating several isophase lines and means permitting the detection of the passages through a receiver of these different isophase lines and the measurement of the time intervals between the passages of these different lines taken in pairs. Actually the measurement of one of these time intervals permits a determination of the locus of the position of the receiver. On ground level this locus, which is one of the position lines mentioned above, is a curve whose form is a function of the respective positions of the transmitters and of the values of the different modulation frequencies employed. This curve form depends therefore on many parameters and the choice of the latter permits position lines of various forms to be obtained and thus attains the above-mentioned object. A certain number of examples of curves obtained by means of the system according to the invention will be described in detail hereunder.

In order that such a position line be fixed in space it is necessary and sufficient that the passage time interval measured by a receiver assumed fixed be always the same in the course of the successive passages of two isophase lines, i. e. that the frequencies of the passages of these two lines be equal. If $p$ and $q$ are the modulation frequencies of the transmitters creating the isophase line $L_1$ and $p'$ and $q'$ the modulation frequencies of the transmitters creating the isophase line $L_2$ it is necessary and sufficient for the position line to be fixed that $F = p - q = p' - q'$.

If the space sweeping laws for the lines $L_1$ and $L_2$ are perfectly defined and known, the measurement of the time interval $i$ between the passages through a point M of the lines $L_1$ and $L_2$ suffices to define a position line for this point M.

If the sweeping frequencies $p-q$ and $p'-q'$ are different, the measurement of $i$ at a fixed point varies from one passage to the following and is no longer sufficient for defining a position line. If, however, the law of variation of the values of $i$ is well known, it would be possible to define the position by noting the instant when this value assumes a fixed value, for example zero and relate this instant to a time base transmitted by a special transmission.

The position determination device according to the invention comprises therefore:

(a) Means for regulating the modulation frequencies and phases of the different transmitters in such manner that the sweeping laws of the isophase lines are perfectly defined and known.

(b) Means for receiving in a receiver the signals of the different transmitters and detecting their modulated signals. These means are standard and well known.

(c) Means for applying in pairs these modulated signals to a phase comparator which produces a signal termed the passage signal P at the moment when the two modulating signals are in phase.

(d) Means for measuring the time interval $i$ which elapses between any two of these passage signals.

(e) Means for manifesting this value of the time interval if it is fixed at a given point or for comparing it with a given time base if it is variable.

Other features and advantages of the invention will appear from the ensuing description with reference to the illustrative drawings in which:

Figs. 17 and 18 show the applications of the invention in special cases in which the position lines assume the form of imposed paths;

The various devices mentioned in the foregoing paragraphs (a) to (e) will now be described.

a. EMISSION

In a preferred mode of carrying out the invention, which is more particularly described hereunder, the number of transmitters is limited to four: A, B, C and D, and the position lines are fixed. In other words, the two isophase lines $L_1$ and $L_2$ have the same sweeping frequency F. Thus it is necessary that the modulation frequencies respectively equal to $p$, $q$, $p'$, $q'$ be such that $p-q=p'-q'=F$.

It is, furthermore, necessary that these sweeps be such that the measurement of the time interval $i$ of the passage of $L_1$ and $L_2$ at a known point be perfectly defined and equal to a fixed value.

This can be arrived at by transmitting to the four transmitters a signal of frequency F furnished by a stabilized oscillator. This synchronization signal is conveniently constituted by a "pip" defined from international signals. Thus, any number of transmitters may be controlled by the same signals and four among them may be chosen, modulated by frequencies $p$, $q$, $p'$, $q'$, to constitute the assembly of transmitters A, B, C and D.

The synchronization signal may also be furnished by a special oscillator and transmitted to the transmitters by any known means, for example a telegraph or telephone cable, a hertzian cable, a special modulation applied to the carrier wave of one of the transmitters, etc.

Figure 1:
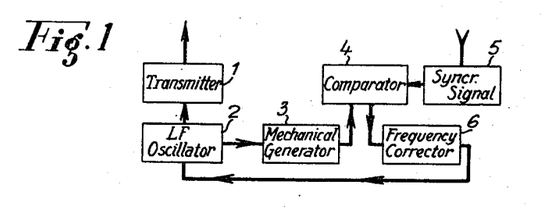
Fig. 1 diagrammatically illustrates one of the transmitters of the system according to the invention.
Figure 1B:
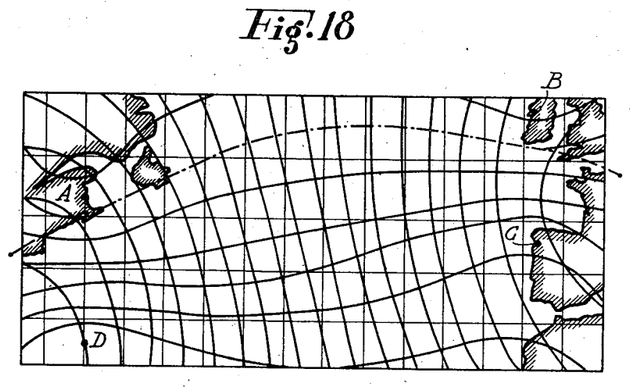

Each HF transmitter 1 (Fig. 1) is provided with a low-frequency oscillator 2 stabilized by a quartz oscillator having a reduced frequency or a tuning fork in a thermostatic envelope. This oscillator 2 is adjusted as near as possible to the theoretical frequency $p$, $q$, $p'$ or $q'$, these frequencies being the exact multiples of the frequency of the synchronization signal F:

$$p=KF,\ q=(K-1)F,\ p'=K'F,\ q'=(K'-1)F$$

where K and K' are integers.

Each oscillator is associated with a controlled mechanical generator 3 (for example a phonic wheel) emitting a comparison signal reduced to the frequency $$\frac{p}{K},\ \frac{q}{K-1},\ \frac{p'}{K'},\ \text{or}\ \frac{q'}{k'-1}$$

This signal is applied to a comparator 4 at the same time as the synchronization signal delivered by 5 with which it must be constantly in coincidence. A frequency corrector 6 controlled by the signal comparator 4 corrects if necessary the frequency of the oscillator 2 so as to maintain this coincidence.

Figure 2:
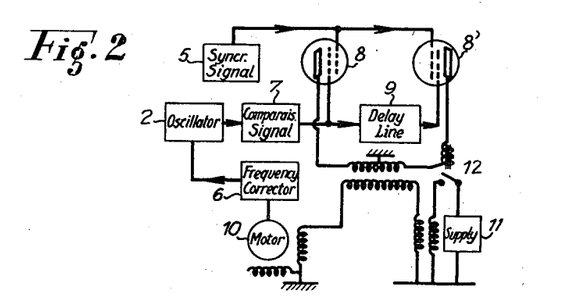
Fig. 2 diagrammatically illustrates a control device.

This assembly may, for example, be constituted in the following manner (Fig. 2):

The synchronization signal delivered by 5 is in the form of a signal of duration $\epsilon$, there is delivered by the mechanical generator 3, controlled by the oscillator 2, the comparison signal 7 in the form of a square signal applied to the suppressor grids of two pentodes 8 and 8' connected by a delay line 9 in such manner that the two signals thus obtained are separated by an interval of time $\epsilon$. Each pentode 8, 8' receives on its other grid the synchronization signal 5; the first pentode 8 controls the rotation of a controlling motor 10 when its two grids are excited simultaneously; the second pentode 8' acts in the same manner but in the reverse direction.

During the search period in the course of bringing the system into operation, the motor 10 rotates in a given direction under the action of a fixed voltage furnished by the source 11; this voltage is eliminated when the pentodes enter into action with the aid of a relay 12.

The motor 10 drives the frequency corrector 6 comprising a capacitor which modifies the frequency of the oscillator so as to maintain the two square signals constantly on either side of the synchronization signal.

There is thereby obtained with the aid of known methods a complete control by a single and same system of synchronization of the modulations and thus a sweeping of space by the isophase lines. It can be seen in particular that the sweeping velocities along the axes are $$V_0=c\frac{p-q}{p+q}=\frac{c}{2k-1}$$

and $$V'_0=\frac{c}{2K'-1'}$$

They do not depend on the real stability of the oscillators so long as this stability is sufficient to permit the correct operation of the above-mentioned synchronization.

From then on, a perfectly defined position line corresponds to a given value of the time interval $i$.

The modulation of the transmitters may be effected by any known means. There may be used directly the sinusoidal voltage of the stabilized oscillator to effect a conventional amplitude or frequency modulation.

The modulation may also be transformed into pulses whose frequency of recurrence are $p$, $q$, $p'$ and $q'$ for the transmitters A, B, C and D respectively. In this case there no longer exist in reality mobile isophase lines but only coincidence lines in the form of branches of hyperbolae so that a receiver situated on such a line receives simultaneously a pulse from the transmitter A and a pulse from the transmitter B or a pulse from the transmitter C and one from the transmitter D. These coincidence lines progress in steps and sweep through space with a discontinuous movement which has, apart from this peculiarity, the same characteristics as the sweeping by continuous-sweep isophase lines. The instant $t_1$ of coincidence of the signals from A and B marks the passage of the hyperbola whose foci are A and B. The instance $t_2$ of coincidence of the signals from C and D marks the passage of the hyperbola whose foci are C and D. The measurement of the time interval $i=t_1-t_2$ defines a position line.

Certain of the transmitters at least may include phase modulating means as will be explained hereinunder.

b. RECEPTION—DETECTION

The receiver receives the signals from the different transmitters on separate chains either at high frequency or medium frequency. These chains are followed by low-frequency stages detecting the signals of frequencies $p$, $q$, $p'$, $q'$. All the circuits assuring this reception are of well-known conventional type.

c. COMPARISON OF THE PHASES—EMISSION OF THE PASSAGE SIGNAL P

Figure 3:
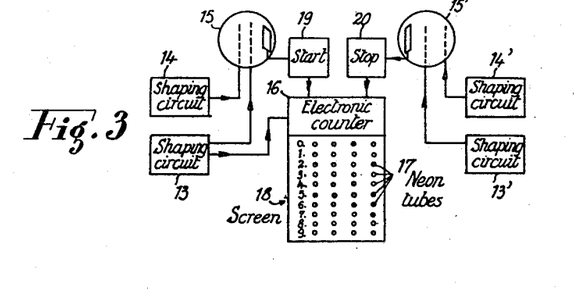
Fig. 3 illustrates the form of a device for the detection of passage of signals and measuring of time interval by means of an electronic counter.

The signals of the frequencies $p$ and $q$ are thereafter applied to a passage detector which may be in the following form:

*Pulse coincidences (Fig. 3).* The signals $p$ and $q$ are transformed into pulses, by shaping circuits 13 and 14 (if they are not already received in this form) and are applied to the two grids of a pentode 15 which delivers a signal when these two pulses are received simultaneously. It can be shown that it is necessary to regulate the duration of the pulses to a value $$\frac{1}{q}-\frac{1}{p}=\frac{p-q}{pq}=\frac{T}{K(K-1)}$$

to obtain at each period T at least one and at the most two coincidences. The first is considered as the signal passage. Thus a systematic error is introduced in the position, but the values of $p$ and $q$ may be so selected that this error is no greater than the errors of the phase meters or mechanical differential devices.

d. MEASUREMENT OF THE INTERVAL OF TIME $i$ AND MANIFESTING THE RESULT

The signals $p$ and $q$ on the one hand and $p'$ and $q'$ on the other having been applied to the passage detectors, the latter deliver two passage signals P and P' which are applied to a time measurer.

This time measurer may be in one of the following forms:

(1) *Electronic counter (Fig. 3).* This counter 16 receives the brief signals of known frequency, for example the signals $p$ themselves, and counts them between the instant of the passage signal P and that of the passage signal P' elaborated by shaping circuits 13' and 14' and by pentode 15'. The result is manifested by neon tubes 17 placed behind a screen 18 whose light remanence is of the order of the period $$T=\frac{1}{p-q}$$

Each signal P returns the counter to zero by means of an electronic commutator 19 and the counting begins again until it is stopped by an electric circuit 20.

(2) *Stroboscopic indicator (Fig. 4).* There is used a motor 21 which rotates at the frequency of F R. P. S. This motor may be controlled by a current of stable frequency. It may comprise a phonic wheel controlled by a tuning fork or by one of the signals received, for example $p$; or it may comprise the rotor of a phase meter or the output shaft of the differential device in the case when the passage detector is of the type 1 or 2 described above.

Figure 4:
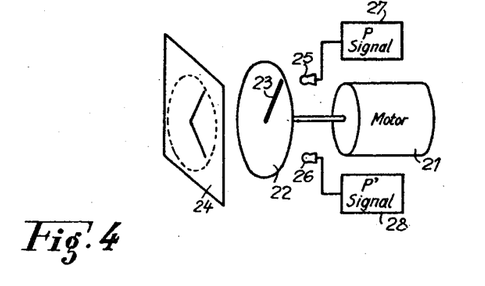
Fig. 4 is a diagrammatic exploded view of a stroboscopic device for measuring the time interval $i$.

This motor drives a disc 22 which carries a radial slit 23 and rotates between neon tubes 25, 26 having different colours and a screen 24 whose light remanence is of the order of T. The passage signals P and P' transmitted at 27, 28 illuminate the neon tubes which cause to appear on the screen two luminous lines the angle between which corresponds to the time interval $i$.

Position lines

At a given value of the time interval corresponds a perfectly defined position line which may be repeated on a special map on which these position lines are plotted.

Very diverse position lines are possible with the system according to the invention. A certain number of cases are described hereunder.

A very interesting special case is that in which $K=K'$, i. e. $p=p'$ and $q=q'$. In this case it is possible, with the aid of four transmitters A, B, C and D, to define not only the two isophase lines $L_1$ and $L_2$ having respectively for foci AB and CD but also two other isophase lines $L_3$ and $L_4$ having respectively for foci AD and CB, the common sweep frequency of these four lines being $F=p-q$. Thus, in measuring the time interval $i$ at a point M between the passage of any two of these isophase lines, it is possible to define a position line. If the same operation is carried out by using these isophase lines in pairs, in any possible way, there are obtained several position lines and, in consequence, a complete determination of the position of the point M by means of only four transmitters.

In fact, if the distances from M to the four transmitters A, B, C and D are $r_A$, $r_B$, $r_C$, $r_D$ respectively, the respective phases of the signals received at M are $$2\pi p\left(t-\frac{r_A}{c}\right),\ 2\pi q\left(t-\frac{r_B}{c}\right),\ 2\pi p\left(t-\frac{r_C}{c}\right),\ 2\pi q\left(t-\frac{r_D}{c}\right)$$

(neglecting the additive constants due to the different propagation times of the synchronization signal). The instants of the passage of the isophase lines are given:

For $L_1$ by $2\pi p\left(t_1-\frac{r_A}{c}\right)=2\pi q\left(t_1-\frac{r_B}{c}\right)+2k\pi$ where $c$ is the velocity of propagation of the electromagnetic waves and $k$ is an integer whence $$t_1=\frac{pr_A-qr_B+kc}{c(p-q)}$$

Similarly:

For $L_2$:

$$t_2=\frac{pr_C-qr_D+kc}{c(p-q)}$$

For $L_3$:

$$t_3=\frac{pr_A-qr_D+kc}{c(p-q)}$$

For $L_4$:

$$t_4=\frac{pr_C-qr_B+kc}{c(p-q)}$$

The measurement of the time intervals between the instants $t_1$, $t_2$, $t_3$, $t_4$ effected in any possible way gives the following position lines:

Lines X defined by $i_1=t_1-t_2$ of form
$$p(r_A-r_C)-q(r_B-r_D)=cFi_1$$
Lines Y defined by $i_2=t_3-t_4$ of form
$$p(r_A-r_C)-q(r_D-r_B)=cFi_2$$
Lines Z defined by $i_3=t_1-t_3=t_4-t_2$ of form
$$q(r_D-r_B)=cFi_3$$
Lines W defined by $i_4=t_1-t_4=t_3-t_2$ of form
$$p(r_A-r_C)=cFi_4$$

Thus, there is obtained four families of position lines. Curves Z and W are hyperbolae having respectively for foci B, D and A, C. The curves X and Y assume extremely varied forms according to the respective positions of the four transmitters. Figs. 10, 11, 12, 13 and 14 give for the curves X and Y examples of their form which will be described in detail hereinunder.

When the transmitters are pulse-modulated, the latter are emitted at multiple instances of $$\frac{1}{p} \text{ or } \frac{1}{q}$$

and the instants of coincidence $t$ at the point M are defined by relations of the form $$t_1 - t_0 = \frac{r_A - r_B}{2V_0}$$

in which $t_0$ is a constant.

The coincidence lines are hyperbolae $C_1$, $C_2$, $C_3$ and $C_4$ defined as follows:

|  | Foci | Equations |
| --- | --- | --- |
| $C_1$ | A, B | $r_A - r_B = 2V_0(t_1 - t_0)$ |
| $C_2$ | C, D | $r_C - r_D = 2V_0(t_2 - t_0)$ |
| $C_3$ | A, D | $r_A - r_D = 2V_0(t_3 - t_0)$ |
| $C_4$ | B, C | $r_C - r_B = 2V_0(t_4 - t_0)$ |

The position lines X are of the form $$r_A - r_C - r_B + r_D = 2V_0 i_1$$

The position lines Y are of the form $$r_A - r_C + r_B - r_D = 2V_0 i_2$$

The lines Z and W remain hyperbolae:

$$r_D - r_B = 2V_0 i_3$$

and $$r_A - r_C = 2V_0 i_4$$

The values of $p$ and $q$ being very near to one another, the curves X remain substantially indentical in the two modulation cases, for $$\frac{cF}{p} \neq \frac{cF}{q} = \frac{2cF}{p+q} = 2V_0$$

Figure 5:
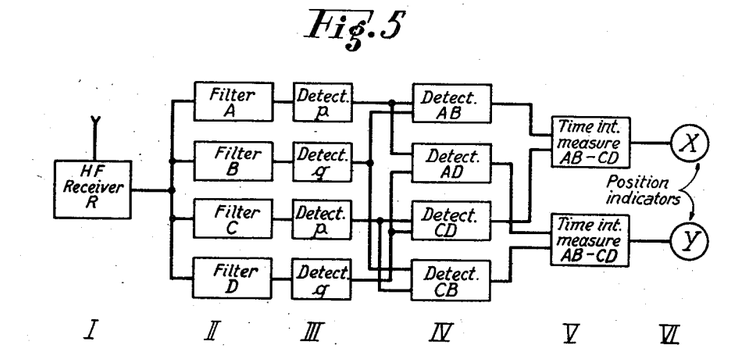
Fig. 5 diagrammatically illustrates a receiver on board a mobile object for effecting subjective position determination.

The receiver on board the mobile object is in both cases established in accordance with the diagram of Fig. 5.

This receiver comprises a HF receiving stage I, a filter stage II for the four carrier waves of the four transmitting stations A, B, C and D, a detecting stage III for the modulations $p$, $q$, $p'$, $q'$ of the respective emissions A, B, C and D, a detecting stage IV for detecting the passages of the isophase lines of the stations A and B, A and D, C and D, A and C, and B, a measuring stage V for the time intervals $i_1$, $i_2$ corresponding respectively to the passages of the isophase lines AB and CD, AD and CB, and, lastly, a stage VI constituted by the position indicators manfesting the results of the measurements furnished by the stage V.

*Transmitter network*

The principle of position determination by means of four transmitters two of which are modulated by the frequency $p$ and two by the frequency $q$, is of wide application. There may indeed be installed over a very wide area, for example Western Europe, a large number of transmitters P modulated by the frequency $p$ and an equal number of transmitters Q modulated by the frequency $q$. Position determination may be effected in associating in some manner two transmitters P and two transmitters Q which affords a very wide choice of curves X, Y, Z, W.

A single transmitter may therefore be utilized in several neighbouring zones (in general four) and this considerably reduces ground equipment costs.

The control of the modulators is obtained by means of a single central station covering the whole of the area to sweep, the controlling method being, for example, one of the following:

(1) The central station emits a carrier wave having a double modulation, the modulation frequencies being equal to $$\frac{p}{2} \text{ and } \frac{q}{3}$$

Figure 6:
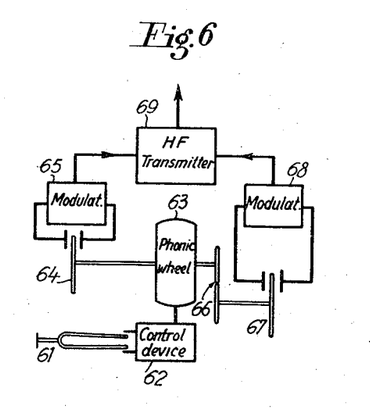
Figs. 6 and 7 diagrammatically illustrate a central station and a slave transmitter utilized in a modification of the invention according to a first controlling process.

This is obtained for example by means of the system diagrammatically shown in Fig. 6 in which a tuning fork 61 vibrating at 2,000 cycles regulates through the medium of a control device 62 a phonic wheel 63 having 100 teeth, which rotates therefore, at 20 R. P. S. This wheel controls, firstly, directly a capacitor 64 having ten bosses controlling a 200 (20×10) cycle modulator 65 and, secondly, through a gear 66, having a ratio 19/20, a rotor of a capacitor 67 having seven bosses controlling a 133 (19×7) cycle modulator 68. These two modulations are applied to the HF transmitter 69.

Figure 7:
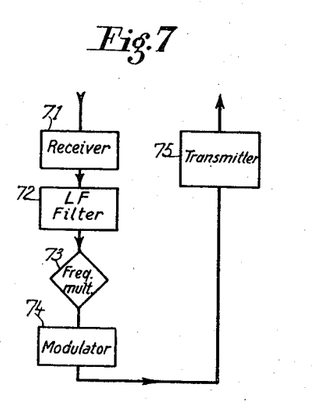

Installed by each transmitter P (or Q) is a receiver which detects the oscillation of frequency $$\frac{p}{2} \text{ or } \frac{q}{3}$$

and applies it after doubling (or tripling) to the modulation of the local transmission. This receiver-transmitter (Fig. 7) comprises a receiver 71, a 200 (or 133) cycle LF filter 72, a frequency doubler or tripler 73, $p=400$ cycles (or $q=399$ cycles) modulator 74 and a transmitter 75.

(2) The central station emits two pure continuous waves of frequency $2^n p$ and $2^n q$. The number $n$ being such that the beat has a frequency $2^n(p-q)$ of at least one kilocycle, for example with $p-q=1$, $n=10$: $2^n(p-q)=1024$.

This beat is applied to an electronic counter which delivers a pulse every $2^n$ alternations, namely $p-q$ pulses per second. The beat and pulse are reproduced on an oscillograph and the counter is started in such manner that the pulse places itself a little before a double point of the beat, which double point will be chosen as a reference point E. This pulse initiates, furthermore, a "pip" which is manifested by a sudden increase in the amplitude of the two continuous waves.

Figure 8:
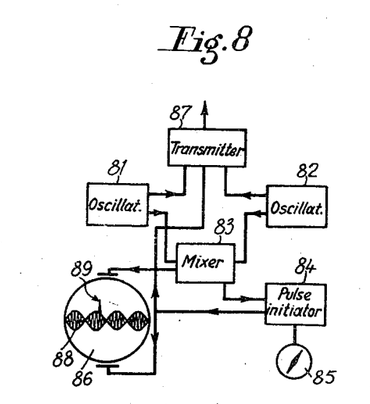
Figs. 8 and 9 diagrammatically illustrate a central station and a slave transmitter used in this same modification according to a second controlling process.

This result is obtained for example by means of the system diagrammatically illustrated in Fig. 8 which comprises two quartz crystal-controlled oscillators 81 and 82, a mixer 83, an electronic counter-pulse initiator 84 with a manual setting device 85, an oscillograph 86 and a transmitter 87 modulated by the oscillators 81, 82 and by the pulse initiator 84. The beat 88 and the pulse 89 are manifested on the screen of the oscillograph 86.

A receiver by each transmitter P or Q detects the beat and applies it to an oscillograph on which is seen the amplified part corresponding to the "pip" and the first double point which corresponds, by definition, to the reference point R. The beat is applied, furthermore, to a counter which delivers $p-q$ pulses per second and the instant of starting the counter and the time constants of the circuits are so regulated as to bring the pulse onto the reference point R. This adjustment being effected once and for all in the course of starting up the transmitter, the pulses start up a second counter to which are applied the oscillations of frequency $2^n p$ or ($2^n q$) selected in the receiver by means of a quartz filter. This second counter delivers a signal every $2^n$ alternations. Thus, there are obtained signals of frequency $p$ (or $q$) which are perfectly controlled in frequency and phase by the central transmitter. By this process utilizing pure continuous waves and receivers having quartz filters, it is possible to obtain wide ranges for the central transmitter and a good protection against interferences.

Figure 9:
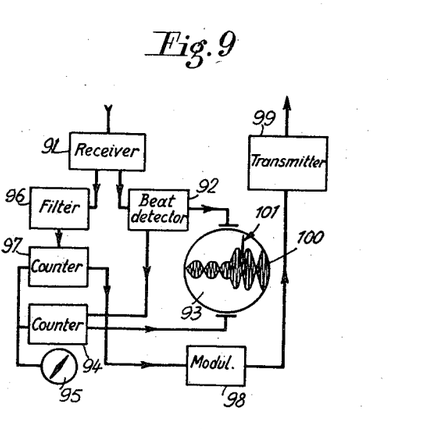

This receiver-transmitter (Fig. 9) comprises a receiver 91 connected to a beat detector 92 itself connected to an oscillograph 93 and to an electronic counter 94 with a manual regulating device 95, a quartz filter 96 tuned to the frequency $F=2^n p$ (or $F'=2^n q$), a second counter 97 delivering a signal every $2^n$ alternations connected to a modulator 98 itself connected to the transmitter 99. The beat 100 and the "pip" 101 appear on the screen of the oscillograph.

*Condition of non-ambiguity*

The values of the frequencies $p$ and $q$ and/or the relative geographic positions of the four transmitters A, B, C and D are subject to a "condition of non-ambiguity" which will now be examined.

In order that a measurement of the time interval $i$ correspond to a single position line it is necessary that the distances between the transmitters ($AB=d_1$, $CD=d_2$, $AD=d_3$, $BC=d_4$) satisfy the conditions defined hereunder:

There is ambiguity for the lines X if there exist two points such that the expressions $p(r_A-r_C)-q(r_B-r_D)$ relating to these two points assume values differing from one another by $cFT$, namely $c$. Indeed, it is impossible to distinguish between two values of the interval $i$ which differ from one another by a period T.

Now, the value $pr_A-qr_B$ varies between a minimum $-qd_1$ (point A and a maximum $+pd_1$ (point B). Similarly, the value $pr_C-qr_D$ varies from $qd_2$ to $+pd_2$. The maximum variation in their difference is from $-qd_1-pd_2$ to $+pd_1+pd_2$, which represents a maximum variation equal to $(p+q)(_1+_2)$.

The condition of non-ambiguity is expressed therefore for the curves X by the inequality $$d_1+d_2<\frac{c}{p+q}$$

Similarly, there is obtained for the curves Y, $$d_3+d_4<\frac{c}{p+q}$$

These two conditions result in non-ambiguity for the curves Z and W, since $$i_3=\frac{i_1-i_2}{2} \text{ and } i_4=\frac{i_1+i_2}{2}$$

Given any zone to sweep, there may be determined the positions of the four transmitters and thence the limit to the modulation frequency $p$ imposed by the conditions of non-ambiguity.

As the precision of position determination diminishes with the frequency, there might be visualized for wide areas a position determination on two scales:

(1) Precise position determination at frequencies $p$ and $q$.

(2) Position determination without ambiguity at frequencies $$\frac{p}{n} \text{ and } \frac{q}{n}$$

in which the distances between the transmitters are such that:

$$d_1+d_2<\frac{nc}{p+q} \text{ and } d_3+d_4<\frac{nc}{p+q}$$

The sweep velocity does not change but the period is multiplied by $n$ and the degree of precision is divided by $n$.

The emissions from A and C are modulated by the frequencies $p$ and $p/n$.

The emissions from B and D are modulated by the frequencies $q$ and $q/n$.

The receivers are provided with a control which substitutes as desired filters tuned to the frequencies $$\frac{p}{n} \text{ and } \frac{q}{n}$$

for the low-frequency filters tuned to the frequencies $p$ and $q$.

If the modulation is effected by pulses the transmitters transform one pulse in $n$ into a pulse of special form and the receivers include a filter which may be put into operation so as to pass only these pulses.

The rest of the apparatus on board the mobile object remains unchanged. A manual control (in principle a push button) enables the non-ambiguous system to be brought into action for an instant when there is some doubt as to the indications from the precise system.

*Form of the position curves and their use*

By selecting the respective geographic positions of the four transmitters A, B, C and D, curves of very diverse forms are obtained.

(1) A coincides with D and B with C.

The system comprises two stations each one of which includes two transmitters modulated by frequencies $p$ and $q$. The isophase lines are propagated in opposite directions and all the position lines are reduced to hyperbolae having the two stations as foci.

Figure 10:
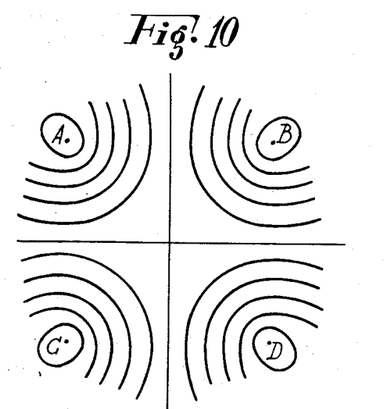
Figs. 10, 11 and 12 show examples of the positions of four transmitters, at the four corners of a square and the networks of position lines thus obtained.

(2) The four transmitters are disposed at the four corners of a square, AB and CD forming two opposite sides oriented in the same direction (Fig. 10).

The network of the lines X and that of the lines Y coincide, they comprise the medians of the square and the closed curves surrounding the corners.

The same curves would be obtained in taking AB and CD as diagonals of the square.

This solution is of very little interest in position determination.

Figure 11:
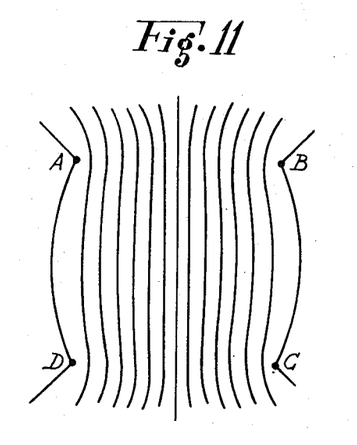

(3) The four transmitters are placed at the corners of a square, AB and CD forming two opposite sides oriented in opposite directions (Fig. 11).

The lines X form a network the curves of which over a wide area are parallel to a median of the square, distortion becoming large only in the neighborhood of the sides.

Figure 12:
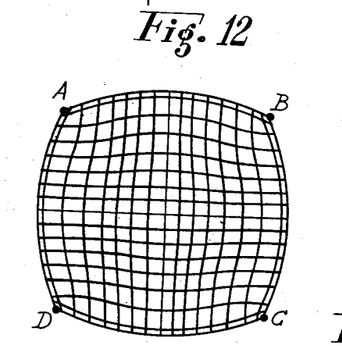
Figure 13:
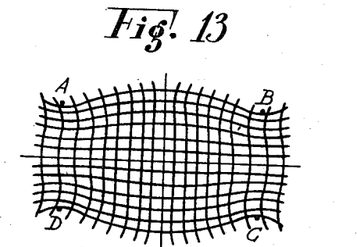
Figs. 13 and 14 show examples of the positions of four transmitters at the four corners of a rectangle and the networks of position lines thus obtained.
Figure 14:
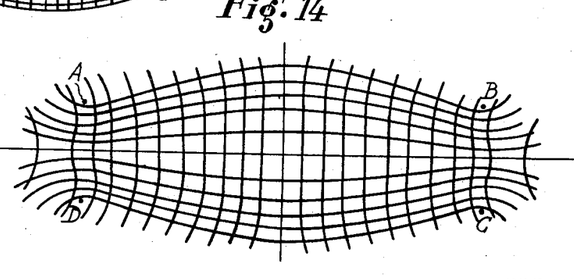

The curves Y are deduced from the curves X by a rotation of the latter through a right angle about the centre of the square (Fig. 12). The curves X and Y intersect (except in the immediate vicinity of the transmitters) at about a right angle. Thus it is possible to establish a geographical skeleton map which is only slightly distorted by arranging a regular square pattern to correspond to the assembly of curves X and Y. The representation is substantially in conformity over a wide area in the centre of the square and is very acceptable over the whole area of the square.

Hence it is possible to trace the route over a geographical map established in accordance with this skeleton map. This map may be wound on a drum by a motor controlled by an indicator I$x$ which manifests the parameter of the curve X. A marker or index is displaced in a direction perpendicular to the direction of winding by a motor controlled by an indicator I$y$ which manifests the parameter of the curve Y. In this case it is advantageous to adopt for the measurement of the time intervals the third type of indicator described above.

There may also be easily established a position indicator giving the polar co-ordinates of the mobile point with respect to any point P situated in the central zone of the square. The I$x$ and I$y$ indicators drive potentiometers producing voltages proportional to the parameters $x$ and $y$ of the curves X and Y. These voltages are applied to the two perpendicular windings of a logometer simultaneously with the voltages proportional to the parameters $x_0$ and $y_0$ of the curves $X_0$ and $Y_0$ passing through the point P. Thus, there are obtained in the two windings the voltages $y-y_0$ and $x-x_0$. The rotor of the apparatus is oriented in a direction $$\theta = \text{arc tan} \frac{y-y_0}{x-x_0}$$

and the voltage received at the terminals of this rotor is proportional to $$R=\sqrt{(X-x_0)^2+(y-y_0)^2}$$

These quantities correspond, with an acceptable approximation, to the polar co-ordinates, azimuth and range with respect to the pole P of the point in question.

Figure 15:
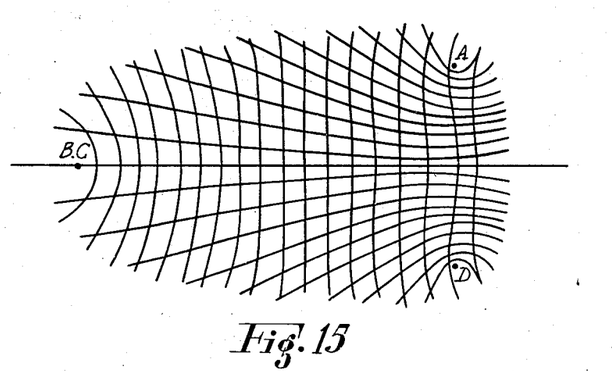
Figs. 15 and 16 show examples of the positions of four transmitters at three points—two transmitters being situated at the same station—and the networks of position lines thus obtained.
Figure 16:
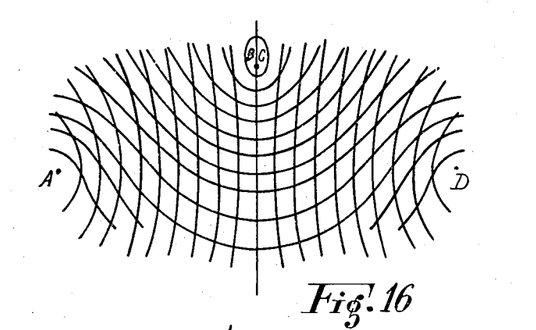

When the local geographical conditions do not allow the transmitters to be disposed in a square pattern, it is often possible to dispose them at the corners of a rectangle (Figs. 13 and 14) or bring two transmitters into a single station thereby forming a triangle (Figs. 15 and 16.)

In the latter case the synchronization of the modulations may be effected locally at the central station between the transmitters B and C. At the station A there is received the emission from C and the signal or frequency $p$ is detected, which then serves to modulate the local emission. Similarly, at the station D there is received the emission from B and the signal of frequency $q$ is detected, which serves to modulate the local emission.

The distortions are generally greater than in the case of the square pattern but remain acceptable over wide areas.

Figure 17:
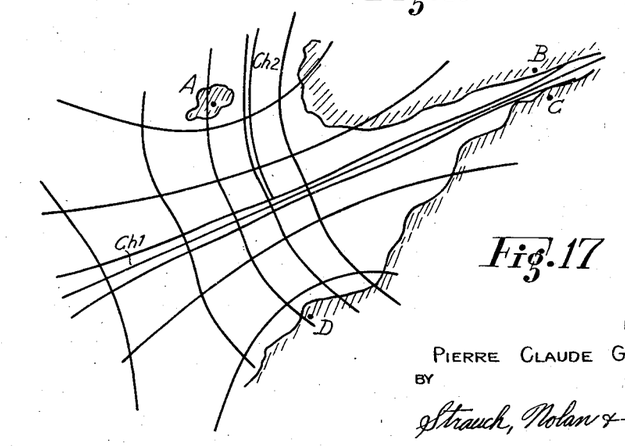

The various forms of the curves X and Y permit, furthermore, in certain cases itineraries of various forms to be defined and marked out in distances. Figs. 17 and 18 show modes of carrying this into effect.

Let it be supposed, for example, that it is necessary to sweep the entrance of an estuary (Fig. 17). There may be utilized a line Y (channel $ch^1$) marked out by the lines X or this channel may be rejoined by following a line X (channel $ch^2$) marked out by the lines Y.

Let it be assumed, according to another example, that it is necessary to define the orthodromic itinerary Paris-New York (Fig. 18). The accurate solution consists in placing the transmitters A and B and the transmitters B and C symmetrically about the itinerary. This solution is practically impossible but it can be seen that with four transmitters placed at easily accessible points a curve Y substantially corresponding to the itinerary from Ireland to Nova Scotia may be defined, the curves X marking out the distances with a very acceptable regularity.

The method according to the invention therefore permits a determination of the position of a mobile object, on board the latter, in an automatic and practically continuous manner (if the period T is sufficiently small), this position being either read off a special map, automatically placed on a route tracer or transformed into polar co-ordinates with respect to the destination point. It is also possible to re-transmit the position of the mobile object to the ground control by utilizing the passages of the isophase lines (or coincidence lines) so as to cause each mobile object to emit a position signal in accordance with the methods described in the aforementioned patent application.

*Regulation of the phases of the modulation frequencies of the transmitters*

As mentioned above, the system may comprise phase regulating means applied to at least some of the transmitters of the system so as to give very divers forms to the position lines whereby the above-mentioned object may be more readily and more perfectly attained.

In particular this regulation permits in certain cases an a priori selection of any line such as an air route, a port access channel, a portion of a meridian or a parallel of the earth, etc. and an arrangement whereby this line becomes a position line in the sense defined above.

This possibility may present itself in particular in the case of a system of the type described above comprising four transmitters A, B, C, and D whose carrier wave frequencies are modulated respectively by the frequencies $p$, $q$, $p'$, $q'$. In this case there may be defined two isophase lines $L_1$, $L_2$ having respectively for foci AB and CD and two other isophase lines $L_3$, $L_4$ having respectively for foci AB and CD. The isophase lines taken in pairs thus permit a definition of the position lines X, Y, Z, W corresponding respectively to the pairs ($L_1$, $L_2$), ($L_3$, $L_4$), ($L_2$, $L_3$), ($L_1$, $L_4$). The improvement described hereinunder is applicable in particular when the line selected, R, is not very far from one of the position lines X, Y, Z, W. The mode of determining the phase modulation laws and the device used for obtaining signals modulated in accordance with these laws will now be described.

Figure 19:
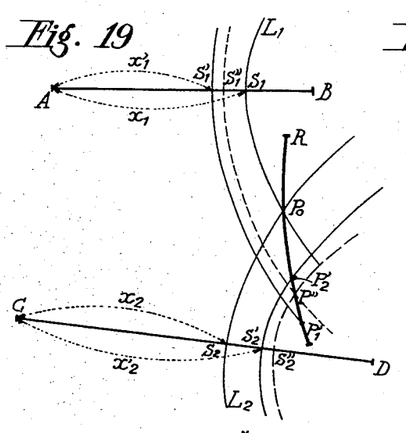
Fig. 19 diagrammatically illustrates a system having four transmitters A, B, C, and D and a route R, this figure also being referred to in the description of a graphic mode of determining a phase modulation law permitting the position lines to be given various forms for the purpose of more readily solving certain position determination problems.

Let it be assumed that a system comprises four transmitters A, B, C and D and a given route R (Fig. 19). There will be considered two isophase lines, for example $L_1$ and $L_2$ defining the position line X, and the points $M_1$ and $M_2$ at which these isophase lines $L_1$ and $L_2$ intersect this route R. In order that R becomes, in accordance with object of the invention, a position line, it suffices to modify the movement of the points $M_1$ and $M_2$ in such manner that they pass through any point on R at instants $t_1$ and $t_2$ separated by a constant time interval $i$. This is obtained by applying to at least one of the modulations of the transmitters A, B, C, and D a suitably regulated phase modulation. This phase modulation has for effect to retard or accelerate the movement of the lines $L_1$ or $L_2$ (without distorting them very much) and thus it is possible within certain limits to regulate at will the movement of the points $M_1$ and $M_2$ so as to render constant the time interval $i=t_1-t_2$ between the instants of passage of two isophase lines through any point on the line R.

The phase modulation law may be defined practically by the following graphical method (Fig. 19):

A point $P_0$ is chosen on R and the hyperbola branches having foci AB and CD passing through this point are plotted. These branches represent the position of the isophase line L at an instant $t_0$ and that of the isophase line $L_1$ at an instant $t_0+i$, their vertices are $S_1$ and $S_2$ on the lines of the foci AB and CD. Let it be assumed that $x_1$ and $x_2$ are the abscissae of these points measured from A and C respectively. If $\Delta t$ is a very short period of time arbitrarily chosen, it can be seen that at an instant $t_0+\Delta t$ the isophase line $L_2$ would have its vertex at a point $S'_2$ so that $x'_2=x_2+V'_0\Delta t$ where $V'_0$ is the velocity $$V'_0=c\frac{p'-q'}{p'+q'}$$

Similarly, at the instant $t_0+i+\Delta t$ the isophase line $L_1$ would have its vertex at $S'_1$ so that $x'_1=x_1+V_0\Delta t$, where $$V_0=c\frac{p-q}{p+q}$$

The two hyperbola branches pasing through $S'_1$ and $S'_2$ in general intersect the route R at two distinct points $P'_1$ and $P'_2$. A point $P''$ is arbitrarily chosen between these two points and the hyperbola branches which intersect the axes at two points $S''_1$ and $S''_2$ are plotted. The phase modulation must have for object to cause the isophase lines $L_1$ and $L_2$ to pass through the points $S''_1$ and $S''_2$ at instants $t_0+i+\Delta t$ and $t_0+\Delta t$ respectively.

The operation is repeated from point to point and there is thereby successively defined on the axis AB a series of points $S_1$, $S''_1$ etc. and on the axis CD a series of points $S_2$, $S''_2$, etc. which must correspond to the instants of passage of the isophase lines equispaced in time by $\Delta t$. Thus it is possible to plot curves giving as a function of time the abscissae $x_1$ and $x_2$ of the vertices of the isophase lines $L_1$ and $L_2$. Let it be assumed that the equations of these curves are $x_1=f_1(t)$ and $x_2=f_2(t)$. Now, the phase modulation is for the transmitter A equal to $2\pi pt+\varphi_A$ and for the transmitter B, $2\pi qt+\varphi_B$, where $\varphi_A$ and $\varphi_B$ are the respective phases of the oscillations at the same instant taken as an origin of time. The position of the vertex of $L_1$ on the focal line AB is given by $$2\pi p\left(t-\frac{x}{c}\right)+\varphi_A=2\pi q\left(t-\frac{d+x}{c}\right)+\varphi_B$$

This equation must be rendered identical to the equation $x=f_1(t)$. This is obtained by rendering at least one of the values $\varphi_A$ or $\varphi_B$ variable as a function of time. In substituting in this equation the values of $x$ for the different values of time according to the equation $x=f_1(t)$, there is defined for each of these values the difference $\varphi_A - \varphi_B$. For example, a constant phase $\varphi_B$ may be given to one of the modulations and a modulation as a function of time applied to $\varphi_A$.

The law of this modulation is thus defined for all the isophase lines meeting the line R. This may be defined arbitrarily for the isophase lines which do not meet the line R. Further, new conditions may be imposed, such as transforming into a position line another route R' meeting all or part of these other isophase lines.

In any case it is necessary that the modulation law permit the period $$T = \frac{1}{p-q}$$

or, more exactly that the phase assume values different from 2K for the different values of time T.

The modulation as a function of time of the phase of the signal from a transmitter A may be obtained in the following manner:

As has been explained above, a central transmitter transmits on a special carrier wave a modulation whose frequency is equal to the frequency $p$ (or $q$) of the signal or to a frequency $f$ from which is easily obtained an oscillation of frequency $p$ or $q$. This tranmitter transmits, furthermore, a frequency signal or "pip" having a frequency $F = p-q$ common to the sweeps of the different isophase lines.

A receiver is placed by the transmitter A and delivers the signals of frequency $f$ and F so that $f = KF$. These signals are received (see Fig. 20) by a control receiver 111 and detected respectively at 112 and 113. The signals of frequency $f$ are applied to a phonic wheel 114 which drives, if necessary through a suitable reduction device 115, a disc 116 which produces at 117 a signal of frequency F. An oscillograph control 118 enables this signal to be compared with the "pip" detected by the detector 113 and a manual phase shifting device 119 enables them to be brought into coincidence by suitably regulating the phase of the phonic wheel 114.

Figure 20:
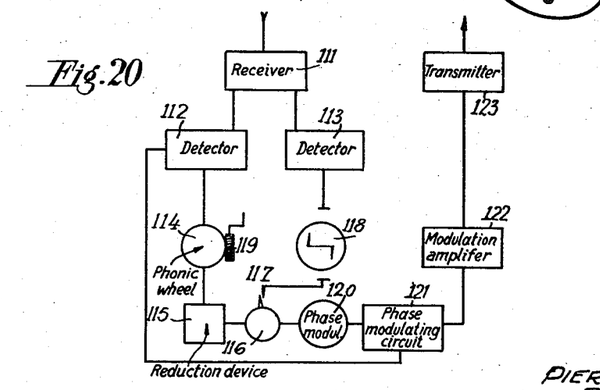
Fig. 20 diagrammatically illustrates a controlling device for the phase modulated transmitters used in the system shown in Fig. 19.

The disc 116 rotates at the frequency F and drives directly a variable phase modulation element 120 acting on the phase modulating circuits 121 which receive from the detector 112 the frequency $f$. The current, modulated by the frequency $f$ and phase modulated, is transmitted to the modulation amplifier 122 and then to the transmitter 123 itself.

The variable element 120 of the phase modulation system may comprise for example one of the following devices:

(a) The rotor of a phonic wheel comprising a number of teeth equal to $p$ (or $q$), the distance between successive teeth being so calculated as to obtain the desired modulation.

Figure 21:
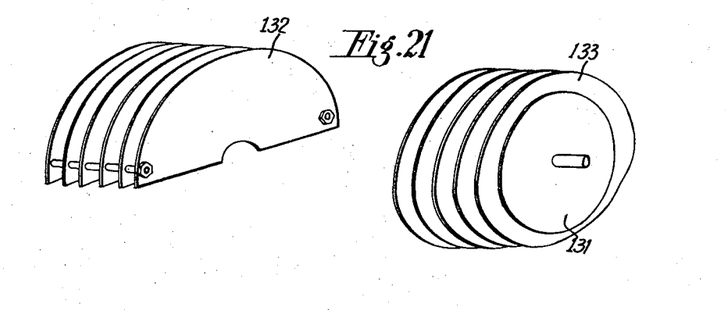
Fig. 21 is a perspective view of a stator and rotor of a variable capacitor used for phase regulation in the transmitter diagrammatically illustrated in Fig. 20.

(b) The variable element 120 comprises a series of cells constituted by fixed resistances and variable capacitances, the latter comprising variable capacitors (Fig. 21) whose rotors 131 are driven by the rotative shaft of the disc 116. The blades of the stator 132 may be of any simple form, for example semi-circular, and the form of the mobile blades 133 of the rotors, taking into account the form of the blades of the stator, are so shaped that the dephasing is equal at each instant $t$ of the period T at the calculated value of A.

Figure 22:
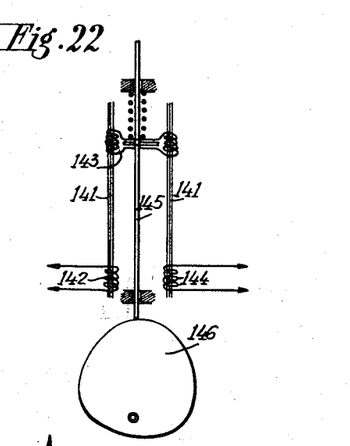
Fig. 22 is a view of another device for phase regulation.

(c) A magnetostrictive delay line (Fig. 22), comprising two magnetostrictive bars 141, 141 receives on a fixed coil 142 mounted on one of the bars the signals from the controlled modulator and retransmits them through a moving coil 143, sliding on the two bars, to a fixed coil 144 connected to the phase modulating circuits. The space between the moving coil and the fixed coils is regulated by a rod 145 controlled by a rotative cam 146. The latter, driven by the rotative shaft of the disc 116, has such shape that the delay of the line corresponds at each instant $t$ to the calculated value $\varphi_A$. If the duration of the delay so necessitates, several delay lines disposed in series may be used.

The above-described method creating arbitrary position lines and the system carrying this method into effect are only applicable in practice provided certain conditions are satisfied.

In particular, it is necessary that the intersection of an isophase line with the route R be unique, and the route R in particular must not intersect the focal axis AB or CD. Furthermore, if the route R is too far away from a position line X, Y, Z or W, the necessary phase modulation is excessive and is no longer obtainable by the simple methods described above.

On the other hand, it is often possible to create simultaneously several routes R, R', etc., particularly when they are not intersected by the same isophase lines. There may even be created simultaneously a route R in the vicinity of a line X and a route R in the vicinity of a line Y (for example meridian and parallel). Actually, the creation of R defines, as a function of time, the values $\varphi_A - \varphi_B$ and $\varphi_C - \varphi_D$. Similarly, the creation of R" defines as a function of time the values $\varphi_A - \varphi_B$ and $\varphi_C - \varphi_D$. Thus, for each value of time there are four equations having four unknown quantities which enables the modulation law for the four phases $\varphi_A$, $\varphi_B$, $\varphi_C$, $\varphi_D$ to be defined.

*Modification of the invention*

According to one modification of the invention, the periods $$T = \frac{1}{p-q} \text{ and } T' = \frac{1}{p'-q'}$$

of the two isophase lines are no longer equal but slightly different. The time interval $i$ between their passages through a point is no longer constant but varies regularly from one passage to another. Thus there may be considered a position line corresponding to a given value of this interval, for example zero. This coincidence line of the two isophase lines is consequently moved and sweeps across space at a frequency $F - F' = (p-q) - (p'-q')$. If an omnidirectional origin signal S is emitted at the instant when it passes through a known point, the measurement of the time interval between the reception of the signal S and the coincidence instant of the isophase lines permits a position line to be defined. As this coincidence line of the isophase lines is mobile, it may be utilized for initiating on board a mobile object a position signal which may be utilized for transmitting the position of the mobile object to the ground control, as has been described in the aforementioned patent application.

Although specific embodiments of the invention have been described hereinbefore, it is to be understood that many changes and modifications may be made therein without departing from the spirit of the invention or the scope of the appended claims.

Having now described my invention what I claim as new and desire to secure by Letters Patent is:

1. In a system for determining the position of a receiving-point relative to spaced transmitters; at least two pairs of spaced fixed ground transmitters for emitting from each transmitter a signal having a carrier component and a modulation component, the carrier components all having different frequencies and the modulation signals emitted by said transmitters having frequencies $p$, $q$, $p'$, $q'$ such that the differences $p-q=F$ and $p'-q'=F'$ are fixed very low frequencies; detecting means at said receiving point for detecting the passage through said receiving point of the isophase line where two modulation signals of frequencies $p$ and $q$ or $p'$ and $q'$ are received in phase coincidence; and, at said receiving point, time measuring means for measuring the time interval $i$ between the passage of an isophase line created by one pair of transmitters and the passage of an isophase line created by another pair of transmitters.

2. A system according to claim 1, wherein the modulation frequencies $p$, $q$, $p'$, $q'$ are harmonics of one fixed very low frequency F, both differences $p-q$ and $p'-q'$ being equal to said frequency F, whereby the frequencies $p, q, p', q'$ are given the following relations:

$$p=KF \quad q=(K-1)F \quad p'=K'F \quad q'=(K'-1)F$$

$K$ and $K'$ being integers.

3. A system according to claim 1, wherein said time measuring means is an electronic counter adapted to count the signals of frequency $p$ between the passages of said two isophase lines.

4. A system according to claim 1, wherein said time measuring means is a stroboscopic indicator.

5. In a system for determining the position of a receiving point relative to spaced transmitters; a central synchronizing station; a number of spaced transmitters each emitting a signal having a carrier component and a modulation component, the carrier components all having different frequencies, and the modulation signals emitted by said transmitters having frequencies $p$ for some of said transmitters (termed P transmitters) and frequencies $q$ for the other transmitters (termed Q transmitters), frequencies $p$ and $q$ being governed by said synchronizing station; detecting means for detecting the passage of an isophase line thus formed by any pair composed of a P transmitter and a Q transmitter; and time measuring means for measuring the time interval $i$ between the passage of the isophase line of such a pair of transmitters and the passage of the isophase line of such other pair of transmitters.

6. System according to claim 5, wherein said central station comprises means for providing a double modulation of a carrier wave emitted by said central station, the modulation frequencies being equal to $$\frac{p}{2} \text{ and } \frac{q}{3}$$

and each P or Q transmitter comprises a receiver, said receiver comprising means for detecting frequency $$\frac{p}{2} \left( \text{or } \frac{q}{3} \right)$$

means for doubling said frequency $p/2$ (or tripling said frequency $q/3$) and means for modulating said local carrier wave by said frequency $p$ (or $q$) thus obtained.

7. System according to claim 5, wherein said central station comprises means for emitting continuous waves of frequencies $2^n p$ and $2^n q$, $n$ being an exponent such that the beat $2^n(p-q)$ is at least equal to 1 kilocycle, and means for emitting at frequency $p-q$ a short signal whereby the amplitude of said two continuous waves is abruptly increased during a portion of a second, a short time before the intersection point of the beat which serves as reference point R; and a receiver arranged in the vicinity of each of said P or Q transmitter, to detect said $2^n p$ (or $2^n q$) frequencies and emit a carrier wave which is modulated by frequency $p$ (or $q$) whereby said frequency $p$ or $q$ is controlled in frequency and in phase by said central installation.

8. In a system for determining the position of a receiving point relative to spaced transmitters, four spaced transmitters arranged at the corners of a quadrilateral A, B, C, D for emitting from each transmitter a signal having a carrier component and a modulation component, the carrier components all having different frequencies, and the modulation signals emitted by said A, B, C, D transmitters having frequencies $p, q, p, q$, respectively, AB and CD being opposite sides of the rectangle and oriented in opposite directions and the difference $p-q$ being equal to one fixed very low frequency F, whereby an isophase line is created by each pair of transmitters comprising a transmitter emitting frequency $p$ (P transmitter) and a transmitter emitting frequecy $q$ (Q transmitter); detecting means for detecting the passage at said receiving point of each of said isophase lines, and time measuring means for measuring the time interval between the passage of an isophase line created by one pair of transmitters comprising a P transmitter and a Q transmitter and an isophase line created by another pair of transmitters comprising a P transmitter and a Q transmitter, whereby a network of position lines is defined inside said rectangle, said network being substantially in the form of a rectilinear regular square pattern.

9. System according to claim 5, wherein the positions of said transmitters and the modulation frequencies are so adapted and arranged that the position curves corresponding to the different values of time interval $i$ coincide with predetermined routes.

10. In a system for determining the position of a receiving-point relative to spaced transmitters; at least two pairs of spaced fixed ground transmitters for emitting from each transmitter a signal having a carrier component and a modulation component, the carrier components all having different frequencies and the modulation signals emitted by said transmitters having frequencies $p, q, p', q'$ such that the difference $p-q=F$ and $p'-q'=F'$ are fixed very low frequencies; detecting means at said receiving point for detecting the passage through said receiving point of the isophase line where two modulation signals of frequencies $p$ and $q$ or $p'$ and $q'$ are received in phase coincidence, and, at said receiving point, time measuring means for measuring the time interval $i$ between the passage of an isophase line created by one pair of transmitters and the passage of an isophase line created by another pair of transmitters, whereby a position line is created corresponding to each value of said time interval $i$, and phase controlling means applied to at least one of said transmitters for varying the form of said position line according to the position determination problem to be solved.

11. In a system for determining the position of a receiving-point relative to spaced transmitters; at least two pairs of spaced fixed ground transmitters for emitting from each transmitter a signal having a carrier component and a modulation component, the carrier components all having different frequencies and the modulation signals emitted by said transmitters having frequencies $p, q, p', q'$ such that the differences $p-q=F$ and $p'-q'=F'$ are fixed very low frequencies; detecting means at said receiving point for detecting the passage through said receiving point of the isophase line where two modulation signals of frequencies $p$ and $q$ or $p'$ and $q'$ are received in phase coincidence; and, at said receiving point, time measuring means for measuring the time interval $i$ between the passage of an isophase line created by one pair of transmitters and the passage of an isophase line created by another pair of transmitters; whereby a position line is created corresponding to each value of said time interval $i$; phase controlling means applied to at least one of said transmitters for varying the form of said position line; and a variable modulation means driven by a rotary shaft controlled by the modulation frequency of said transmitters for synchronizing said phase controlling means.

References Cited in the file of this patent

UNITED STATES PATENTS

| | | |
|---|---|---|
| 1,942,262 | Shanklin | Jan. 2, 1934 |
| 2,050,276 | Chubb | Aug. 11, 1936 |
| 2,083,945 | Evans | June 15, 1937 |
| 2,141,282 | Southworth | Dec. 27, 1938 |
| 2,727,231 | Gaudillere | Dec. 13, 1955 |

FOREIGN PATENTS

| | | |
|---|---|---|
| 577,629 | France | June 7, 1924 |